United States Patent
Moore

(10) Patent No.: US 6,592,294 B1
(45) Date of Patent: Jul. 15, 2003

(54) SITU FORMATION OF APATITE FOR SEQUESTERING RADIONUCLIDES AND HEAVY METALS

(75) Inventor: Robert C. Moore, Edgewood, NM (US)

(73) Assignee: Sandia Corporation, Albuquerque, NM (US)

( * ) Notice: Subject to any disclaimer, the term of this patent is extended or adjusted under 35 U.S.C. 154(b) by 84 days.

(21) Appl. No.: 10/008,769

(22) Filed: Oct. 25, 2001

Related U.S. Application Data

(63) Continuation-in-part of application No. 09/516,481, filed on Mar. 1, 2000, now Pat. No. 6,416,252.
(60) Provisional application No. 60/328,582, filed on Oct. 10, 2001.

(51) Int. Cl.$^7$ .............................. E02D 3/12; B09B 1/00
(52) U.S. Cl. ........................... 405/129.25; 405/128.75; 588/250; 435/262.5
(58) Field of Search ................ 588/17, 250; 405/128.1, 405/128.15, 128.45, 128.5, 128.7, 128.8, 129.27, 128.75, 129.1, 129.25, 129.45; 435/262.5

(56) References Cited

U.S. PATENT DOCUMENTS

| | | | | |
|---|---|---|---|---|
| 4,869,621 A | | 9/1989 | McLaren et al. | 405/263 |
| 5,139,365 A | | 8/1992 | Chesner | 405/129 |
| 5,502,268 A | | 3/1996 | Cote | 588/259 |
| 5,512,702 A | | 4/1996 | Ryan et al. | 588/256 |
| 5,676,819 A | * | 10/1997 | Lindgren et al. | 588/204 |
| 5,678,233 A | | 10/1997 | Brown | 588/2 |
| 5,711,015 A | | 1/1998 | Tofe | 588/1 |
| 5,926,771 A | | 7/1999 | Brown | 588/2 |
| 5,961,437 A | | 10/1999 | Smith | 588/249 |
| 6,416,252 B1 | * | 7/2002 | Moore | 405/129.45 |

OTHER PUBLICATIONS

Gauglitz, R. M. Holterdorf, W. Frank, and G. Marx, "Immobilization of Actinides by Hydroxyapatite." Mat. Res. Symp. Proc. vol. 257 pp. 567–573 (1992).

Jeanjean, J., J. C. Rouchaud, L. Tran, and M. Fedoroff, "Asorption of Uranium and Other Heavy Metals on Hydroxyapatite.", Radionanal. Nucl. Chem. Letters, vol. 201 (6) pp. 529–539 (1995).

(List continued on next page.)

Primary Examiner—Heather Shackelford
Assistant Examiner—John Kreck
(74) Attorney, Agent, or Firm—Robert D. Watson

(57) ABSTRACT

Methods for in situ formation in soil of a permeable reactive barrier or zone comprising a phosphate precipitate, such as apatite or hydroxyapatite, which is capable of selectively trapping and removing radionuclides and heavy metal contaminants from the soil, while allowing water or other compounds to pass through. A preparation of a phosphate reagent and a chelated calcium reagent is mixed aboveground and injected into the soil. Subsequently, the chelated calcium reagent biodegrades and slowly releases free calcium. The free calcium reacts with the phosphate reagent to form a phosphate precipitate. Under the proper chemical conditions, apatite or hydroxyapatite can form. Radionuclide and heavy metal contaminants, including lead, strontium, lanthanides, and uranium are then selectively sequestered by sorbing them onto the phosphate precipitate. A reducing agent can be added for reduction and selective sequestration of technetium or selenium contaminants.

41 Claims, 4 Drawing Sheets

OTHER PUBLICATIONS

Momma, H and T. Kamiya, "Preparation of Hydroxyapatite by the Hydrolysis of Brushite." J. Mat. Sci. vol. 22 pp. 4247–4250 (1987).

Arey, J. S., J. C. Seaman, and P. M. Bertsch, "Immobilization of Uranium in Contaminated Sediments by Hydroxyapatite Addition", Environ. Sci. Technol. vol. 33 pp. 337–342 (1999).

Madsen, H.E.L. and F. Christensson, "Precipitation of Calcium Phasphate at 40° C from Neutral Solution." J. Crystal Growth, vol. 114 ppg. 613–618 (1991).

Brown, P. W. and M. Fulmer, "Kinetics of Hydroxyapatite Formation at Low Temperature." J. Am. Ceram. Soc., vol. 74(5) pp. 934–940 (1991).

Elsevier, "Effect of Citric Acid on the Nucleation of Hydroxyapative in a Simulated Body Fluid" 1999 Elsevier Science Ltd.

LeGeros, "Calcium Phosphates in Oral Biology and Medicine" Karger.

R. C. Moore, "In Situ Formation of Phosphate Barriers in Soil" SD6412.

\* cited by examiner

SITU FORMATION OF APATITE FOR SEQUESTERING RADIONUCLIDES AND HEAVY METALS

CROSS-REFERENCE TO RELATED APPLICATIONS

This application is a continuation-in-part application of U.S. patent application Ser. No. 09/516,481, entitled "In Situ Formation of Phosphate Barriers in Soil," to Robert C. Moore, filed on Mar. 1, 2000, now U.S. Pat. No. 6,416,252 and the specification thereof is incorporated herein by reference. This application claims the benefit of the filing of U.S. Provisional Patent Application Ser. No. 60/328,582, entitled In Situ Formation of Apatite for Sequestering Radionuclides and Heavy Metals, filed Oct. 10, 2001, and the specification thereof is incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

The invention relates generally to treatment of wastes in soil and groundwater, and more specifically to in situ formation of apatitic compounds that selectively trap and contain radionuclides and heavy metals.

Leakage of radioactive materials and heavy metals from storage tanks and subsequent migration away from the containment area continues to be a significant unresolved problem at a number of government and private storage sites. Various techniques are used to try to isolate leaking storage containers and contaminated soil to prevent movement of contaminants into uncontaminated soil and especially groundwater.

One approach is simply to attempt to dig up and remove the contaminated soil. This, however, is costly, and disturbance of contaminated soil carries the risk that some contaminants will be missed or released and left to migrate further. Excavation also has a negative effect on soil stability. Excessive digging and excavation around waste tanks, for example, has the potential to aggravate waste transport by damaging heavily corroded containment drums and disturbing already contaminated soil.

Another approach is to establish an impermeable barrier or seal in the soil of a contaminated site in order to prevent migration of contaminants beyond the barriers. Barriers of this sort that are in use at various sites around the United States and abroad include vertical sleeves of steel or plastic placed in trenches surrounding a site. They also include walls formed through the injection of highly pressurized cementations grout in holes drilled in the soil. Emplacement of such barriers typically requires greatly disturbing the soil and often there is no convenient way to create a "floor" or continuous barrier beneath the leaking tank or contaminated region. Consequently, the sequestration of the contaminants is incomplete and contaminants continue to migrate downward and may thereafter migrate outward. For areas under waste tanks, waste trenches and certain geological formations, forming a continuous impermeable barrier or seal is difficult and sometimes impossible.

Another approach is to create a permeable, chemically reactive barrier or zone that selectively actively attracts and chemically binds, sorbs, or traps contaminants (i.e., sequestration), while allowing water and other components or contaminants to pass through unaffected.

These chemically reactive materials can be combined with other components to form slurries that harden in the ground, forming semi-permeable reactive barriers. Jet injection processes, for example, are known and used wherein machines pump slurries in holes drilled around the perimeter of a leaking vessel or contaminated site. Additionally, trenches can be dug and backfilled using chemical sorbent materials. Each of these techniques, however, carries the disadvantages previously mentioned relating to significant disturbance of the soil and difficulty in fully surrounding (or encapsulating) a leaking waste tank or region of contaminated soil.

In situ formation of chemically reactive barriers or zones have shown considerable promise for removing certain radionuclides, heavy metals, and organic contaminants from soil and groundwater. An in situ barrier can have two parts: a permeable, chemically reactive zone that contains a material such as zero valent iron that sorbs radionuclides, and an impermeable section to funnel or direct groundwater into the permeable reactive zone. In situ permeable reactive barriers have advantages over other treatment technologies, such as pump and treat. These include the ability to treat large quantities of groundwater, easy retrieval of contaminants sorbed onto the reactive material, and lower cost in some instances. However, current in situ barrier designs can have problems with biofouling of the iron active media, variable porosity in the reactive zone that can cause groundwater to flow around or below the barrier zone, and relatively high cost.

Phosphate compounds, in general, can precipitate radionuclides (such as actinides) and heavy metals (lead, strontium, uranium, lanthanides) out of aqueous solution. Calcium phosphate compounds, and in particular, apatitic compounds (i.e., "apatites"), are very well suited to sequestering those contaminants. The mineral of human tooth enamel, dentin, and bone was identified as a calcium phosphate compound with an apatite structure as early as 1926 using x-ray diffraction. It has recently been discovered that apatitic compounds have an especially strong chemically affinity for radionuclides and heavy metals. Apatitic compounds have, generally, the chemical formula $Ca_5(PO_4)_3X$, where X is a halide or hydroxyl. The term "apatite" refers to a group of calcium phosphate compounds that share the same crystal structure. Apatitic compounds are chemically and morphologically similar to natural bone. A closely related mineral, hydroxyapatite, $Ca_{10}(PO_4)_6(OH)_2$, also found in human enamel, dentin, and bone, is also particularly effective at sequestering radionuclides and heavy metal contaminants (e.g., lead). Apatitic compounds and hydroxyapatite are very water insoluble, thermodynamically very stable, and naturally corrosion-resistant.

A number of studies over the past several decades have shown that radionuclides and heavy metals bind onto the surface of apatites and hydroxyapatite in such a fashion that they are almost totally immobilized. (Gauglitz, R, M. Holterdorf, W. Frank, and G. Marx, "Immobilization of Actinides by Hydroxyapatite," Mat Res. Symp. Proc. Vol. 257 pp. 567–573 (1992); Jeanjean, J., J. C. Rouchaud, L. Tran, and M. Fedoroff, "Sorption of Uranium and Other Heavy Metals on Hydroxyapatite," Radioanal. Nuc. Chem. Letters, vol. 201(6) pp. 529–539 (1995); Arey, J. S., J. C. Seaman, and P. M. Bertsch, "Immobilization of Uranium in Contaminated Sediments by Hydroxyapatite Addition," Environ. Sci. Technol. Vol. 33 pp. 337–342 (1999)). Consequently, apatitic compounds and hydroxyapatite have been used to trap, immobilize, and/or contain (i.e., sequester) radionuclides or heavy metals around contaminated sites and leaking storage containers.

Direct injection into the ground (or a container) of apatite is difficult at high concentrations, since apatite is a solid, water-insoluble material. Also, the diffusion or spreading of the apatite away from the injection site is limited by its chemical form, therefore requiring a larger number of injection holes.

In situ formation of apatite or hydroxyapatite can be accomplished via spontaneous conversion of brushite ($CaHPO_4 \cdot H_2O$) or other calcium phosphates, very slowly over time through the mechanism of hydrolysis. See Momma, H and T. Kamiya, "Preparation of Hydroxyapatite by the Hydrolysis of Brushite," J. Mat. Sci. vol. 22 pp. 4247–4250 (1987); Boskey, A. L. and A. S. Posner "Formation of Hydroxyapatite at Low Supersaturation," J. Physical Chem, vol. 80(1) pp. 40–45 (1976)).

More rapid in-situ formation of apatite or hydroxyapatite permeable reactive barriers or zones can be accomplished by separately injecting aqueous solutions of free phosphate and free calcium at different sites, as taught in U.S. application Ser. No. 09/516,481, which is incorporated herein by reference. By a variety of diffusion and migration mechanisms, the injected phosphate reagent mixes underground with the injected calcium reagent, then reacts to form the apatite or hydroxyapatite permeable reactive barrier or zone. Separate injection of the two different reagents at different sites allows for a larger volume of soil to be treated. Injection of the two reagents in the same hole could possibly plug up the hole (at high concentrations), or only treat a small volume (at lower concentrations), since the two reagents react quickly when in contact.

A wide variety of unidentifiable and identifiable insoluble calcium phosphate compounds can be formed by mixing calcium chloride ($CaCl_2$) and potassium hydrogen phosphate ($K_2HPO_4$). These calcium phosphate compounds can be used to form relatively solid, water insoluble physical underground barriers that can slow or stop migration of contaminants. However, they will, in general, not sequester radionuclides and heavy metals because they have no chemical affinity for them.

Apatite, the most stable and least soluble subset of calcium phosphates known (and the most effective phosphate for sorbing radionuclides and heavy metals) is relatively difficult to form because it is not kinetically favored compared to the other unidentifiable and identifiable calcium phosphate compounds formed by mixing together calcium chloride ($CaCl_2$) and potassium hydrogen phosphate ($K_2HPO_4$) or sodium phosphate ($Na_3PO_4$). Apatite, while not kinetically favored, is known to be thermodynamically favored to form. Consequently, apatite can be preferentially formed over the other undesirable forms of calcium phosphate if the pH, concentration, temperature, and soil conditions are appropriately controlled (to be discussed later).

A need remains, however, for a relatively rapid in situ method of forming a permeable reactive barrier or zone comprising apatitic compounds, including apatite and/or hydroxyapatite, where the method is capable of utilizing a single injection hole, and where the permeable reactive barrier or zone provides complete or near-complete containment and immobilization of radionuclide or heavy metal contaminants present in a large volume of contaminated soil or groundwater.

SUMMARY OF THE INVENTION

The present invention relates to methods for in situ formation in soil of a permeable reactive barrier or zone comprising a phosphate precipitate, such as apatite or hydroxyapatite, which is capable of selectively trapping and removing radionuclides and heavy metal contaminants from the soil, while allowing water or other compounds to pass through. A preparation of a phosphate reagent and a chelated calcium reagent is mixed aboveground and injected into the soil. Subsequently, the chelated calcium reagent biodegrades and slowly releases free calcium. The free calcium reacts with the phosphate reagent to form a phosphate precipitate. Under the proper chemical conditions, apatite or hydroxyapatite can form. Radionuclide and heavy metal contaminants, including lead, strontium, lanthanides, and uranium are then selectively sequestered by sorbing them onto the phosphate precipitate. A reducing agent can be added for reduction and selective sequestration of technetium or selenium contaminants.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
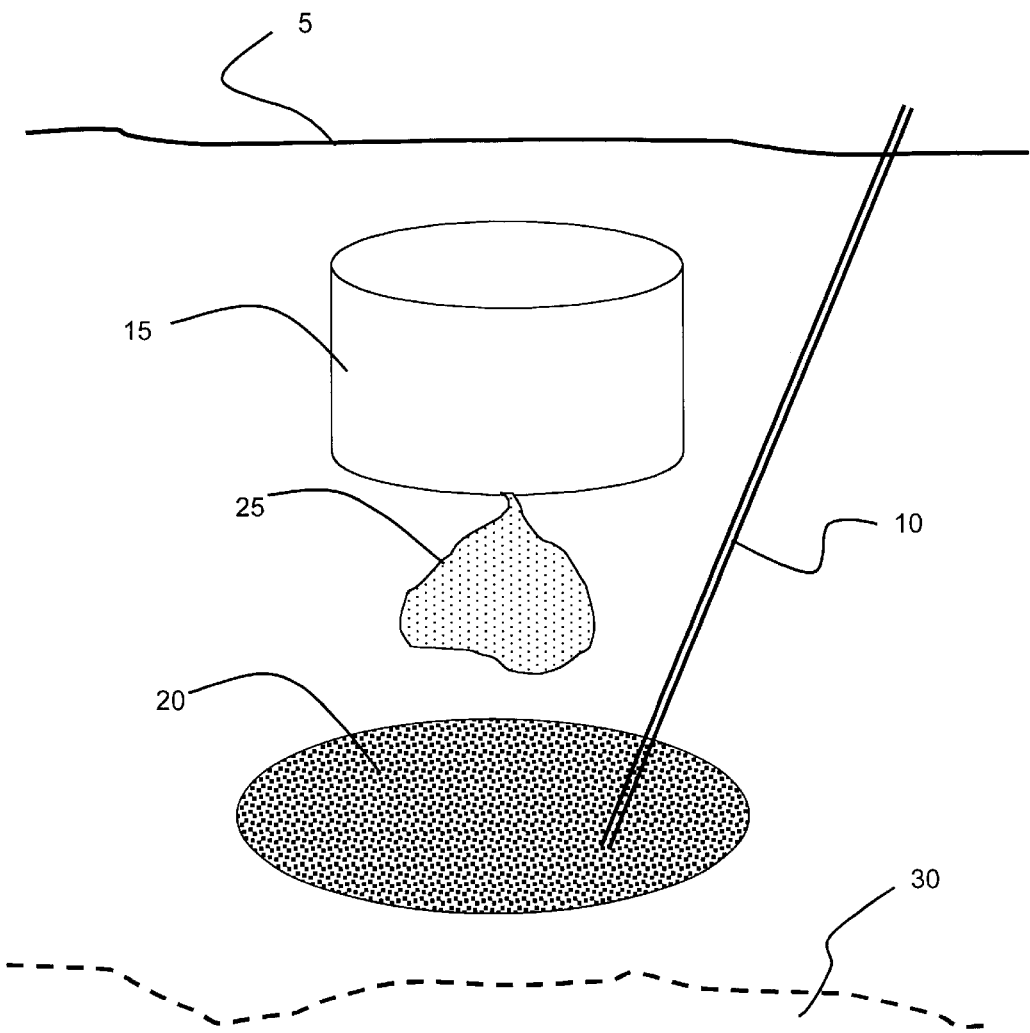
FIG. 1 is a schematic illustration showing a side view of how chemical solutions are injected into soil below a containment vessel to form a reactive barrier capable of preventing downward migration of waste.

The present invention relates to an in situ method of forming a permeable reactive barrier or zone comprising apatite or apatitic compounds or minerals (e.g., hydroxyapatite) by injecting a preparation of chemically reactive reagents into the contaminated soil. As the reagents in the preparation react in situ, under the proper chemical conditions, apatitic material is precipitated in the soil.

The reagents can be a form of chelated calcium and a phosphate reagent. The phosphate reagent and chelated calcium reagent are not initially reactive, however, due to binding of the calcium by the chelate. Subsequently, over time, free calcium is slowly released from the chelated calcium reagent and becomes available to react with the phosphate reagent to form the apatitic compound. The rate of release of free calcium by biodegradation of the chelate may be controlled, for example, by modulating microbial action, such as by concurrent or sequential injection of microbial nutrients, or by control of the local temperature. Elevated temperatures and radiation can accelerate the process of releasing free calcium from the chelated calcium reagent. The $Ca^{2+}$ phosphate formation will also naturally go by itself by shifting the chemical equilibrium. As free calcium reacts with $PO_4^{2-}$ and produces solids, the reaction [Ca free+$PO_4^{2-}$ free→$CaPO_4$] is shifted to the left and more $Ca^{2+}$ is released.

The in-situ formed apatite, hydroxyapatite, and/or apatitic compounds can be used to selectively sequester radionuclides, actinides, strontium, lead, lanthanides, uranium, heavy metals, and any other compound that reacts and/or binds and/or sorbs to the apatite, hydroxyapatite, and/or apatitic compounds.

The word "soil" is defined herein to be any underground material that is capable of supporting transport, migration, movement, or diffusion of contaminants, including radionuclides and heavy metals, by groundwater or other underground fluids or gases. The word "barrier" is defined herein to be an underground zone or region where these contaminants are selectively sequestered, sorbed, or adsorbed through chemical reactions and physical effects. The barrier can be permeable to groundwater flow, semi-permeable, or impermeable. The phrase "in situ formation" is defined herein to include in situ formation inside of a container, such as a tank containing hazardous wastes located above ground, or buried under the ground. The permeable reactive barrier selectively binds, traps, and/or sequesters contaminants, where the word "selectively" refers to specific, targeted contaminants that are sequestered, while allowing water and other untargeted contaminants to pass through the permeable barrier.

Phosphates, in general, serve to precipitate radionuclides and heavy metals out of aqueous solution. Calcium phosphates, and in particular apatites, are very well suited to sequestering those contaminants. One embodiment of the present invention involves injecting an aqueous mixture comprising a phosphate solution pre-mixed with a chelated calcium solution into the soil. The rate that the phosphate and calcium migrate outward from the point of injection can be controlled. Depending on conditions, including the extent to which the reactants are diluted, as well as the pH and temperature of the reactants and surrounding soil environment, various calcium phosphate precipitates, including the most stable and effective forms: apatite or hydroxyapatite, are formed rapidly or slowly.

Alternatively, the aqueous phosphate solution and the aqueous chelated calcium solution can be injected separately, whereupon they mix underground and react together to form the desired apatitic compound or hydroxyapatite compound.

The present invention is especially well suited to the formation of apatitic compound or hydroxyapatite permeable reactive barriers (PRB's). Other phosphate materials also have benefit in the context of radionuclide and heavy metal decontamination and sequestration, and the inventive principles of injection and subsequent chemical availability of the calcium have application in the context of such other phosphate materials.

Apatitic compounds, such as phosphates other than apatite, have been demonstrated to sequester actinides and heavy metals, and in some circumstances, it is desirable to deliberately form in the soil calcium phosphates other than apatite. Also, as noted, over time brushite ($CaHPO_4 \cdot H_2O$) and other calcium phosphates can spontaneously convert into apatite. Apatite is very water insoluble and thermodynamically very stable, and therefore advantageous as a sequestration barrier material because of its resistance to degradation in the presence of natural corrosive elements, including water. Accordingly, in instances wherein apatite is the desired product, there are clear advantages to being able to form in situ apatite directly and rapidly, rather than having to wait for other forms of calcium phosphate material to change into apatite.

A fundamental chemical reaction underlying the in situ formation of apatitic compounds useful for permeable reactive barriers, according to the present invention, involves combining a phosphate, such as sodium phosphate ($Na_3PO_4$) or potassium phosphate with a salt, such as $CaCl_2$, wherein the salt has formed in-situ from microbial decomposition (i.e., digestion) of an organic acid chelate, such as citric acid, chelated to the salt. The addition of an organic acid (e.g., citric acid) slows down the formation of apatite crystals, which eliminates the need to mix calcium chloride and potassium phosphate underground (if mixed aboveground, the solid precipitates could clog up the injection apparatus). Consequently, the chelated calcium reagent and the phosphate reagent can be premixed above ground without fear of prematurely forming the phosphate precipitate, and then easily injected as an aqueous solution into the contaminated soil. Conditions of pH, temperature, and reactant dilution affect the rate of reaction and success with which apatite is formed. If the proper conditions are not present, then the most desirable apatitic compounds will not form. For example, combining calcium and phosphate ions at concentrations greater than 10 mM will not form apatite or hydroxyapatite at room temperature or colder.

Apatite is generally a forgiving family of minerals in that strict adherence to stoichiometric proportions is not necessary when combining reactants to form an effective permeable reactive barrier, especially where dilute reactants are injected at basic pH and elevated temperature. The use of aqueous solutions enables the reactants to diffuse through the soil some distance before free calcium becomes available through degradation of the chelate, whereupon the phosphate and calcium harden to form the phosphate precipitate. The outward diffusion of the two reagents prior to reacting permits a larger volume of soil to be treated. This is to be contrasted with the situation where solutions containing free calcium and free phosphate are simultaneously injected in the same hole and mix underground to rapidly react and form phosphate precipitates. In this latter case, a much smaller volume would be treated.

In applying the method to actual cases of soil contamination, especially where apatite or hydroxyapatite reactive barriers are desired, it is advantageous to ascertain the temperature and pH characteristics of the target soil prior to injection of reagents. Using that information, it is possible to adjust the reagent formulations and conditions so that they exhibit the optimum pH and temperature characteristics according to the invention as the reagents diffuse through the soil and react with each other. At a pH of between 7 and 9 in the soil, the conditions for forming apatite are most favorable. However, the pH of the solution that is injected might be less than 7 or greater than 9, depending on the pH of the soil prior to injection.

Likewise, it is advantageous to ascertain and consider physical characteristics of soil, including the degree of compaction of the soil and presence of moving groundwater in the soil. This information can be used to appropriately adjust the injection pressure or select a suitable alternate injection method. If, for example, a predominant direction of groundwater flow is apparent, this can be used to advantage in dispersing the reagents into a specific soil region wherein a permeable reactive barrier is desired. Following are example embodiments illustrating various approaches to introducing reagents into soil according to the principles of the invention.

Using the methods of this invention, a phosphate reagent and a chelated calcium reagent are employed, and may be co-administered at a single site, in a borehole, or the like. The chelated calcium can include a biodegradable chelate, e.g., a biodegradable organic acid chelate. The chelate can be citrate, such that calcium citrate is utilized. Chelates other than citrate can be used as a biodegradable ligand for calcium, e.g., lactate, EDTA, isosaccarinic acid and other organics. In general, any organic, preferably acid, chelate that complexes with calcium may be employed.

Naturally occurring microorganisms in the soil can digest and biodegrade the chelate, thereby releasing free calcium, which reacts in situ with the phosphate reagent to form a permeable reactive material comprising calcium phosphate (including apatite or hydroxyapatite under the proper conditions). The citrate is metabolized by microorganisms in the soil or groundwater. Thus any of a wide variety of known microbial nutrients may be utilized to accelerate the biodegradation process, including nitrates, such as sodium nitrate, potassium nitrate, ammonium nitrate, or ammonium phosphate. In general, any source of nitrogen nutrients that microbes can utilize may be used.

Formation of apatites optimally occurs at a pH from about 7 to about 9, Thus any of a wide variety of well-known reagents may be employed to adjust the pH to the optimal range, such as a carbonate buffer or a phosphate buffer. In one embodiment, pH-adjusting reagents can be delivered subsequent to injecting the solution of phosphate and chelated calcium, and may further serve to disperse the phosphate and chelated calcium over the desired area. Nutrients to enhance microbial action may be administered prior to, with or subsequent to administration of pH adjusting reagents.

Formation of apatitic compounds occurs more rapidly and more completely at elevated temperatures (e.g., 60–100 C.). However, in the present invention, heating of the chelated calcium and phosphate reagents is not required to form apatite, since the release of free calcium due to microbial digestion generally occurs slowly over time, thereby producing low concentrations of free Ca. At these low concentrations, elevated temperatures are not required to form apatite (See Boskey, A. L. and A. S. Posner "Formation of Hydroxyapatite at Low Supersaturation," J. Physical Chem, vol. 80(1) pp. 40–45 (1976)).

The addition of fluoride enhances conditions for apatite formation. Thus a fluoride reagent may be administered with the phosphate and chelated calcium, or subsequent thereto. In one embodiment, sodium fluoride is employed. In general, any water-soluble fluoride may be employed, including, but not limited to, sodium fluoride or potassium fluoride.

In one embodiment of the present invention, the sodium phosphate concentration can be in the range of about 0.00001 M to about 1 M. In another embodiment of the present invention, the concentration of chelated calcium can be in the range of about 0.00001 M to about 1 M. In another embodiment of the present invention, the ratio of calcium atoms to phosphate atoms in the solution can be about five to three (5:3).

In one embodiment, an aqueous solution comprising a mixture of 100 mM citrate, 50 mM calcium chloride, and 30 mM sodium hydrogen phosphate is premixed, for subsequent injection into the soil. The citrate and calcium chloride form a calcium citrate complex or chelate, thereby rendering the calcium unavailable for immediate reaction with the phosphate. A nitrate compound, such as 10 mM of ammonium nitrate, may be added to enhance microbial metabolism. Similarly, 20 mM of sodium fluoride may be added to enhance in situ apatite formation. Herein, the notation "1 M" means an aqueous concentration of 1 mole/liter, and "1 mM" means $10^{-3}$ moles/liter.

Permeable reactive barriers comprising apatite or apatitic compounds work well for irreversible adsorption of contaminants such as radionuclides, actinides, uranium, strontium, lead, lanthanides, and other heavy metals. However, other contaminants, such as technetium (Tc) and selenium (Se) are not irreversibly adsorbed in the absence of a suitable reducing agent. Consequently, for treatment of sites containing Tc or Se, a reducing agent may be employed. Suitable reducing agents include Fe (II) or Sn (II) reducing agents, such as $SnCl_2$ or $FeC_2$. Other stannous-containing reducing agents, such as stannous tartrate or stannous phthalate, may similarly be employed. These reducing agents may be employed with the phosphate and chelated calcium reagents of this invention, or may be employed with any other method for introducing apatites to form in situ barriers or reactive zones. In one embodiment, subsequent to introduction of phosphate and chelated calcium reagents, and optimally subsequent to introduction of microbial nutrients and fluoride reagents, a suitable Fe (II) or Sn (II) reagent is introduced. Such introduction may be by the same means employed to introduce other reagents, such as by means of low or high pressure injection, dispersion over a soil layer, or other means.

FIG. 1 illustrates an embodiment of the present invention wherein a waste tank is encapsulated with phosphate precipitate using principles of the invention. Referring to FIG. 1, a waste tank 15 is shown in side view, buried in soil beneath the soil surface 5, A borehole or injection well 10 through which chemical solutions are injected from the surface 5 is provided. The injection well 10 need not have a large diameter; rather it need be only of sufficient cross-sectional size to permit injection of aqueous solutions into a region in proximity to the waste tank 15, as shown in FIG. 1. Injection may be accomplished by pumping the solution or solutions directly through the injection well 10, or alternatively, by pumping reactant solutions through injection pipes positioned in the injection well 10, In any case, the injection well 10 provides for penetration of the soil from the soil surface 5 to the region proximate to the waste tank 15, as shown. In this embodiment of the present invention, the permeable reactive barrier can be formed without significant detriment to soil stability.

The diameter and other physical characteristics of the injection well 10 and the method for creating the injection well in the soil will depend on various factors such as degree of soil compaction, physical constituents in the soil, and so forth. In one embodiment, an injection well may be made by driving an injection pipe into the ground, if soil conditions will accommodate this. In other instances, it may be necessary to dig or drill to create the necessary injection well. If required for the desired dispersion pattern, more than one injection well 10 may be employed at a given site.

According to this embodiment, reactants of suitable pH and temperature (according to the principles explained above) are injected through the injection well 10, Injections can be directed so that when the chemical reactions forming the phosphate precipitate take place, the tank 15 can be substantially surrounded or encapsulated by the phosphate precipitate. As noted, when the reactants in aqueous solution enter the soil, they tend to migrate as a result of capillary action through the soil. This capillary action is also responsible for causing the reactants to disperse in situ, thereby causing the formation of the phosphate barrier over the desired area. Likewise, as noted, other factors including injection pressure and groundwater movement contribute to movement of the aqueous solutions, thereby causing formation of the phosphate barrier over the desired area.

In FIG. 1, a permeable reactive barrier 20 is shown which generally forms a barrier under waste tank 15, preventing downward migration of the contaminant plume 25 into groundwater 30, It is contemplated that a plurality of injection wells 10 may be used, but the necessary number and orientation of the injection well 10 will depend on specific circumstances and conditions present concerning, for example, the waste to be encapsulated and the given soil conditions. To achieve-optimal sequestration, precise placement of injection wells is not needed so long as qualitatively the permeable reactive barrier 20 that is formed substantially halts migration of the material sought to be sequestered.

In the illustration of FIG. 1, a leaking waste tank is shown (see plume 25), however, the principles of the invention are equally applicable where a plume of actinides or heavy metals, for example, is present in the soil. Due to the reactive nature of the barrier formed (for example, using apatite), movement of contaminants can be arrested, and effective sequestration can be accomplished in a wide range of instances where the barrier is formed in situ around and even in the midst of contaminant species.

Figure 2:
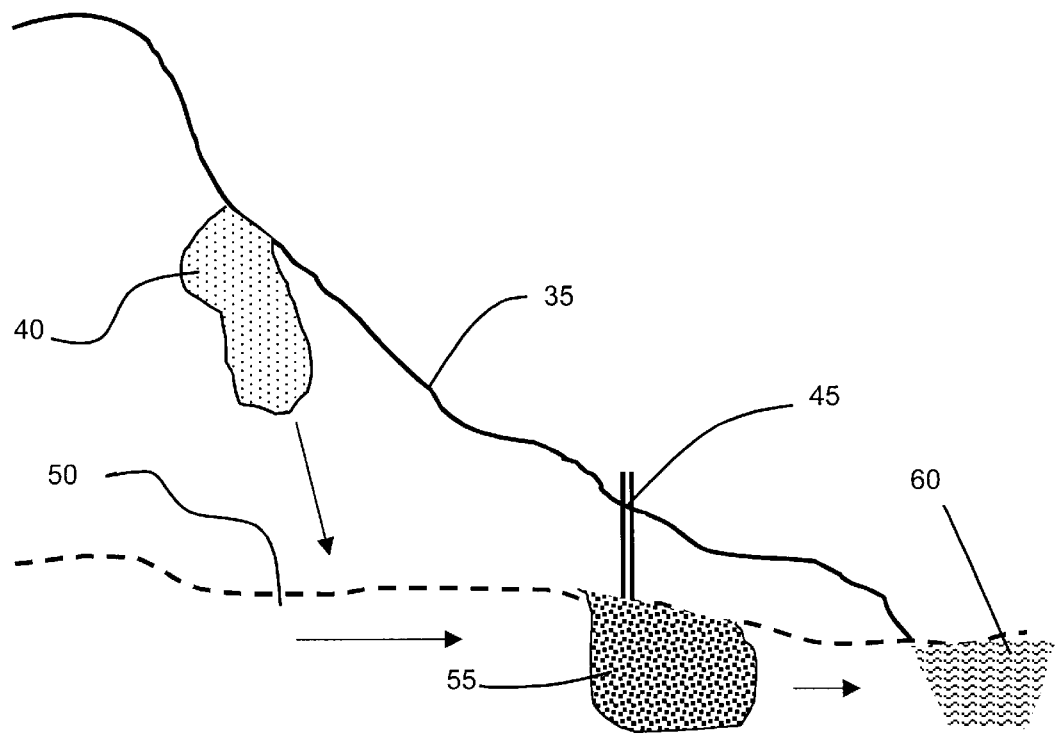
FIG. 2 is a schematic illustration showing an alternative to the embodiment shown in FIG. 1, but wherein an apatite barrier of this invention prevents migration of waste into a river.

FIG. 2 illustrates an embodiment wherein the chemical reaction and injection principles described in the disclosure can be used to form a wall, for example, to obstruct migration of contaminants. In the illustration, contaminants from a waste site or plume 40 (such as in a waste trench) or other contaminant source pose a risk associated with movement toward water such as a stream or river 60, In the illustrated example, a barrier 55 is interposed between the plume 40 and river 60 according to the same principles described elsewhere in the present application. By drilling beneath ground surface 35 by use of well hole or bore 45, an aqueous solution of calcium citrate and phosphate are introduced, resulting in apatite permeable reactive barrier 55 in aquifer 50, which aquifer 50 represents the migration path of waste. In addition to calcium citrate and phosphate, fluorides and microbial nutrients can also be introduced through bore 45, Such introduction, including introduction of calcium citrate and phosphate, can be cycled or repeated as desired to result in apatite barrier 55 of desired size and density. The apatite permeable reactive barrier 55 permits water to pass through, but selectively sorbs and removes radionuclides, heavy metals and other contaminants that bind to apatitic compounds.

This embodiment illustrates that although the method of the present invention can sequester contaminant sources by encapsulation, in situ formation of phosphate barriers (especially apatite) can be of benefit even where other barrier configurations, like walls, are used. Depending on the injection techniques used and the barrier required or desired, walls of this sort may be created at various depths. The invention method is useful for forming barriers at depths in excess of thirty feet, for example, where digging traditional trenches (and then filling them with a barrier material) to isolate waste is not a favored approach or perhaps even feasible. Problems with trenches of such depth result because they may need to be very wide depending on soil conditions in order to satisfy engineering and safety considerations. Costs and safety risks, including those associated with radiation hazard, are likely to be significant when such large trenches are dug. The barrier formation method of the present invention is not subject to geometric limitations of the sort associated with trenches.

Figure 3:
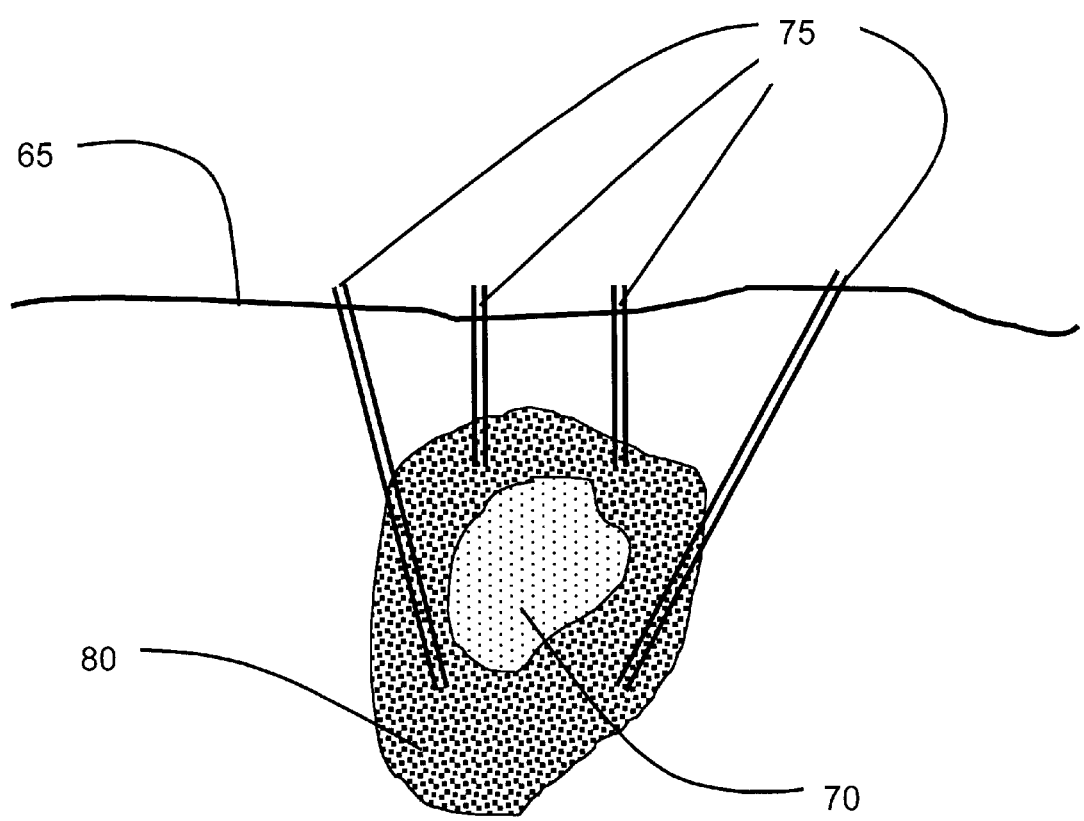
FIG. 3 is a schematic illustration showing completely surrounding a buried waste source.

FIG. 3 depicts a side view of a buried waste site 70 completely below ground surface 65, Such waste site 70 is completely encapsulated by utilizing a multiplicity of well holes or bores 75, through which calcium citrate and phosphate, and optionally fluorides and microbial nutrients, are introduced, resulting in encapsulating apatite barrier 80.

Heat (consistent with the temperature ranges noted throughout this disclosure) can be applied to increase the rate of apatite formation. Heat can be introduced to system using pipes (e.g., metal pipes). Since the reagent solutions are electrolytes, electricity can be conducted between two adjacent wells, thereby generating resistance heating in situ. (Heron, G., M. V. Zutphen, T. H. Christensen, and C. G. Enfield, Soil Heating for Enhanced Remediation of Chlorinated Solvents: A Laboratory Study on Restive Heating and Vapor Extraction in a Silty, Low-Permeable Soil Contaminated with Trichloroethyene. Environ. Sci. Technol. 1998, 32, pp.1474–1481). Alternatively, hot gas or gases, water, or steam can be pumped into an injection well and recovered from a recovery well to heat the soil.

Finally, it is noted that although the previously described embodiments focus on injecting reagents into the soil (albeit, even at low pressure), the necessary migration in situ can occur likewise in instances where reagents are simply poured on the surface of soil. This is because many of the physical principles causing percolation of reagents through soil apply regardless of whether the reagents are actively or passively introduced into the soil. Therefore, it is anticipated that certain applications wherein the principles of the invention are advantageous or desirable include relying on the option of simply pouring reagents in locations where migration of the reagents in the soil results in the requisite migration in situ in the soil. Therefore, unless otherwise specified or necessitated by context, the terms inject, injecting and injection are intended to encompass passive methods of introducing reagents into soil including simply pouring them on the soil surface. Similarly, the reagents may be introduced, by injection or other means as described, as a powder or slurry, and water or another suitable fluid subsequently introduced, by the same or different means, to disperse the reagents and to effect the desired molar concentration of reagents over the desired area.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

INDUSTRIAL APPLICABILITY

The invention is further illustrated by the following non-limiting examples.

Example 1

Figure 4:
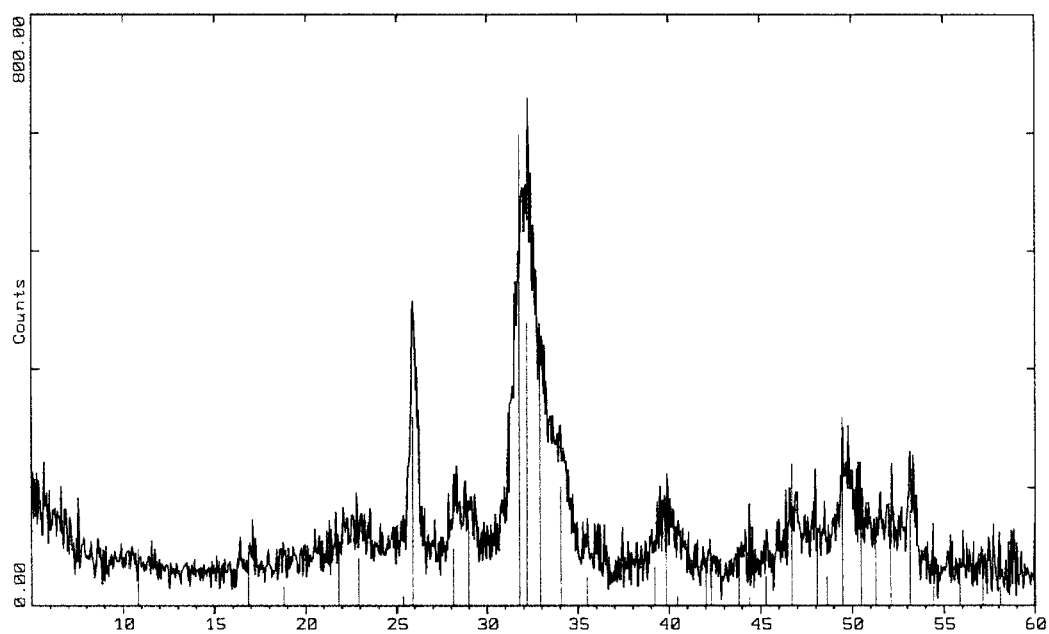
FIG. 4 is a plot of an X-ray diffraction pattern for apatite formed in situ using calcium citrate and sodium phosphate.

100 mM sodium citrate, 50 mM calcium chloride and 30 mM sodium hydrogen phosphate ($Na_2HPO_4$) at an initial pH of 8.5 were mixed and injected into soil from the Albuquerque area. The sodium citrate reacts with the calcium chloride to form calcium citrate plus NaCl. 10 mM nitrate was added to enhance microorganism metabolism, and 20 mM sodium flouride was added to enhance apatite formation. Over a two-week reaction period, the pH decreased to pH 7.4, FIG. 4 shows the resulting X-ray diffraction pattern of the material precipitated into the soil. The vertical lines in FIG. 4 are X-ray diffraction peak signatures for apatite. The measured X-ray diffraction pattern matches very well with that of apatite.

Example 2

Solutions of low concentration, 0.001 M of sodium citrate, 0.001 M of sodium phosphate, and 0.001 M calcium complexed to the citrate were mixed. After 2 weeks, 90% hydroxyapatite was formed.

Example 3

Solutions with higher concentrations, 0.1 M of sodium citrate, 0.1 M of sodium phosphate, and 0.001 M calcium complexed to the citrate were mixed. After 2 weeks, 80% apatite was formed.

Example 4

Batch experiments were conducted using soil. Apatite was formed by injection of calcium citrate, sodium phosphate, sodium fluoride and ammonium nitrate at pH 8.5. Apatite formed in approximately three weeks. Thereafter, strontium or uranium was added, and allowed to contact with the soil for 24 hours. Experiments were performed by contacting 1 to 2 g of soil with 25 mL of a 0.1 M $KNO_3$ solution at an initial pH of 8.0, Desorption experiments were performed by adding 25 mL of fresh 0.1 M $KNO_3$ solution to the solids after the initial solution was removed. The results are shown for strontium in Table 1 and for uranium in Table 2, Only 20% of strontium desorbed from apatite (treated) soil, while 35–43% desorbed of untreated soil at 72 hours. For uranium, no desorption was detected from apatite (treated) soil, while over 30% desorbed off untreated soil at 48 hours. Other experiments showed that strontium adsorption increased with a minimum of 100 hours contact with the apatite-containing soil, and that desorption under similar experimental conditions correspondingly decreased.

TABLE 1

Treatment of Soil Having Strontium (Sr)

| SOIL (g) | INITIAL Sr CONCENTRATION (M) | Sr CONCENTRATION (M) AFTER 24 HOUR CONTACT WITH SOIL | % Sr SORBED ON SOIL | % DESORBED (72 Hours) |
|---|---|---|---|---|
| 1.0 g UNTREATED SOIL | $1 \times 10^{-6}$ | $7.4 \times 10^{-7}$ | 26% | 43% |
| 2.0 g UNTREATED SOIL | $1 \times 10^{-6}$ | $5.9 \times 10^{-7}$ | 41% | 35% |
| 1.0 g TREATED SOIL | $1 \times 10^{-6}$ | $5.3 \times 10^{-7}$ | 47% | 23% |
| 2.0 g TREATED SOIL | $1 \times 10^{-6}$ | $4.0 \times 10^{-8}$ | 60% | 17% |

TABLE 2

Treatment of Soil Having Uranium (U)

| SOIL (g) | INITIAL U CONCENTRATION (M) | U CONCENTRATION (M) AFTER 24 HOUR CONTACT WITH SOIL | % U SORBED FROM SOIL | % DESORBED FROM SOIL (48 Hours) |
|---|---|---|---|---|
| 1.0 g UNTREATED SOIL | $1 \times 10^{-6}$ | $3.8 \times 10^{-7}$ | 62% | 33% |
| 2.0 g UNTREATED SOIL | $1 \times 10^{-6}$ | $2.6 \times 10^{-7}$ | 74% | 31% |
| 1.0 g TREATED SOIL | $1 \times 10^{-6}$ | $1.1 \times 10^{-7}$ | 89% | 0% |
| 2.0 g TREATED SOIL | $1 \times 10^{-6}$ | $7.1 \times 10^{-8}$ | 93% | 0% |

Example 5

Batch experiments were conducted to determine the effectiveness of reducing agents to reduce $TcO_4^-$, with subsequent adsorption of the Tc to apatite. Bovine apatite, heat-treated to remove organic components of bone, and synthetic apatite were employed. 0.5 g of apatite was added to 25 mL of distilled water. 0.1 M $KNO_3$ was added as an electrolyte. The initial Tc concentration in each sample was $1 \times 10^{-6}$ M. $SnCl_2$ or $FeCl_2$ were added as reducing agents. The samples were allowed to incubate under agitation for seven days and subsequently analyzed for Tc. The results are shown in Table 3, For all samples, free Tc decreased by several orders of magnitude. Desorption experiments were performed by separating the solids and adding fresh water. After 24 hours, Tc in water was negligible. To test for reversibility under oxidizing conditions, 5 mL of a 30% $H_2O_2$ solution was added, and analysis performed after 24 hours. Thereafter, an additional 5 mL of the 30% $H_2O_2$ solution was added, with a subsequent analysis after an additional 24 hours. As shown in Table 3, virtually no Tc desorbed, even under oxidizing conditions, using a stannous reducing agent, within up to about 40% desorping under the same conditions using a ferrous reducing agent.

TABLE 3

Use of Reducing Agents to Reduce $TcO_4$

| Sample Contents | $TcO_4^-$ initial (M) | $TcO_4^-$ 7 days (M) | 24 hrs. water at pH 8 | Percent Desorbed 24 hrs after water 5 ml 15% $H_2O_2$ added | 48 hrs after additional 5 ml 15% $H_2O_2$ added |
| --- | --- | --- | --- | --- | --- |
| $TcO_4^-$ 0.5 g synthetic apatite 0.2 g $SnCl_2$ | $1.00 \times 10^{-6}$ | $1.00 \times 10^{-10}$ | 0 | 3% | 4% |
| $TcO_4^-$ 0.5 g bovine apatite 0.2 g $SnCl_2$ | $1.00 \times 10^{-6}$ | $1.00 \times 10^{-10}$ | 0 | 2% | 3% |
| $TCO_4^-$ 0.5 g synthetic apatite 0.2 g $FeCl_2$ | $1.00 \times 10^{-6}$ | $5.00 \times 10^{-9}$ | 1% | 27% | 40% |
| $TcO_4^-$ 0.5 g bovine apatite 0.2 g $FeCl_2$ | $1.00 \times 10^{-6}$ | $4.00 \times 10^{-9}$ | 2% | 39% | 40% |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. For example, in the preceding disclosure, a premixed aqueous solution of a phosphate reagent and a chelated calcium reagent is injected into the soil. Alternatively, the phosphate reagent and a chelated calcium reagent can be injected in a dry, powder form, and water can be injected later or the reagents can dissolve in preexisting groundwater.

The entire disclosures of all references, applications, patents, and publications cited above are hereby incorporated by reference.

What is claimed is:

1. A method for selectively sequestering a contaminant in soil comprising:
   introducing into soil a preparation comprising a phosphate reagent and a chelated calcium reagent;
   releasing free calcium from the chelated calcium reagent;
   contacting together the phosphate reagent and the released free calcium;
   reacting the phosphate reagent and free calcium to form a phosphate precipitate; and
   sorbing the contaminant onto the phosphate precipitate, whereby the contaminant is selectively sequestered.

2. The method of claim 1, wherein the preparation comprises an aqueous solution comprising a phosphate reagent and a chelated calcium reagent.

3. The method of claim 2, wherein the aqueous concentration of the phosphate reagent is in the range of about 0.00001 M to about 1 M.

4. The method of claim 2, wherein the aqueous concentration of the chelated calcium reagent is in the range of about 0.00001 M to about 1 M.

5. The method of claim 2, wherein ratio of calcium atoms to phosphate atoms in the aqueous solution is about five to three (5:3).

6. The method of claim 2, wherein a pH of the solution is in the range of about 5 to about 10.

7. The method of claim 6, wherein the pH of the solution is about 7.

8. The method of claim 1, wherein the preparation comprises a mixture of dry powders comprising the phosphate and chelated calcium reagents.

9. The method of claim 1, wherein the phosphate precipitate formed is a precipitate selected from the group consisting of an apatitic compound and hydroxyapatite.

10. The method of claim 1, wherein the phosphate reagent is selected from the group consisting of sodium phosphate and potassium phosphate.

11. The method of claim 1, wherein the chelated calcium reagent comprises an organic acid chelate.

12. The method of claim 1, wherein the chelated calcium reagent comprises at least one chelate selected from the group consisting of citrate, lactate, EDTA, and isosaccarinic acid.

13. The method of claim 1, wherein the contaminant is selected from the group consisting of a radionuclide and a heavy metal.

14. The method of claim 1, wherein the preparation further comprises a water-soluble fluoride compound.

15. The method of claim 14, wherein the fluoride compound is selected from the group consisting of sodium fluoride and potassium fluoride.

16. The method of claim 1, wherein releasing free calcium from the chelated calcium reagent comprises biodegrading the chelated calcium reagent by microbial action; and wherein the method further comprises introducing into the soil at least one microbial nutrient for enhancing the microbial biodegradation action.

17. The method of claim 16, wherein the microbial nutrient comprises a nitrogen-containing compound selected from the group consisting of sodium nitrate, potassium nitrate, ammonium nitrate, and ammonium phosphate.

18. The method of claim 1, wherein the method further comprises introducing into the soil a reducing agent, whereby the reducing agent reduces the contaminants to a redox state capable of binding to the phosphate precipitate.

19. The method of claim 18, wherein the reducing agent is selected from the group consisting of Sn(II) and Fe(II) reducing agents.

20. The method of claim 19, wherein the reducing agent is selected from the group consisting of $SnCl_2$ and $FeCl_2$.

21. The method of claim 18, wherein the reducing agent is selected from the group consisting of stannous tartrate and stannous phthalate.

22. The method of claim 18, wherein the reducing agent is introduced into the soil after introducing the preparation comprising a phosphate reagent and a chelated calcium reagent into the soil.

23. The method of claim 16, further comprising introducing into the soil a reducing agent after introducing the microbial nutrient into the soil and after introducing the preparation comprising a phosphate reagent and a chelated calcium reagent into the soil, whereby the reducing agent reduces the contaminants to a redox state capable of binding to the phosphate precipitate.

24. A method for in situ formation of a permeable reactive barrier in soil, comprising:
    introducing into the soil an aqueous solution comprising a phosphate reagent and a chelated calcium reagent;
    biodegradeably releasing free calcium from the chelated calcium reagent by natural microbial action;
    contacting together the phosphate reagent and the released free calcium; and
    forming the permeable reactive barrier by reacting the phosphate reagent and free calcium to form a phosphate precipitate.

25. The method of claim 24, wherein the phosphate precipitate is selected from the group consisting of an apatitic compound and hydroxyapatite.

26. The method of claim 24, wherein the phosphate reagent is selected from the group consisting of sodium phosphate and potassium phosphate.

27. The method of claim 24, wherein the chelated calcium reagent comprises an organic acid chelate.

28. The method of claim 24, wherein the chelated calcium reagent comprises at least one chelate selected from the group consisting of citrate, lactate, EDTA, and isosaccarinic acid.

29. The method of claim 24, wherein the method further comprises the step of introducing into the soil a microbial nutrient, whereby the nutrient enhances the natural microbial action.

30. The method of claim 29, wherein the microbial nutrient comprises a nitrogen-containing compound selected from the group consisting of sodium nitrate, potassium nitrate, ammonium nitrate, and ammonium phosphate.

31. The method of claim 24, wherein introducing the aqueous solution into the soil is achieved by a performing a method selected from the group consisting of pouring the solution on the surface of the soil, injecting the solution through at least one hole formed in the soil, injecting the solution through at least one open-ended pipe emplaced in the soil, injecting the solution through at least one porous structure emplaced in the soil, injecting the solution so that a buried container is substantially encapsulated, and any combination thereof.

32. The method of claim 24, further comprising introducing a reducing agent into the soil, whereby the barrier comprises a reducing agent.

33. The method of claim 32, wherein the reducing agent is selected from the group consisting of Sn(II) and Fe(II) reducing agents.

34. The method of claim 24, wherein the permeable reactive barrier is in situ formed in the midst of a contaminant species.

35. The method of claim 24, wherein the step of introducing into the soil an aqueous solution comprising a phosphate reagent and a chelated calcium reagent is repeated as many times as necessary to form a permeable reactive barrier of a sufficient size and density.

36. The method of claim 24, further comprising heating the soil in a region where the aqueous solution was introduced.

37. The method of claim 36, wherein heating comprises injecting a hot fluid into the soil.

38. The method of claim 36, wherein heating comprises electrically resistance heating the soil by passing an electric current through the soil containing the aqueous solution.

39. An underground permeable reactive barrier formed by performing the in situ process of claim 24.

40. The barrier of claim 39, wherein the process further comprises the step of introducing into the soil a microbial nutrient, whereby the microbial nutrient enhances microbial action to remove the chelate portion of the chelated calcium.

41. The barrier of claim 39, wherein the process further comprises the step of injecting into soil a reducing agent selected from the group consisting of Sn(II) and Fe(II).

* * * * *

UNITED STATES PATENT AND TRADEMARK OFFICE
CERTIFICATE OF CORRECTION

PATENT NO.    : 6,592,294 B1                                              Page 1 of 1
DATED         : July 15, 2003
INVENTOR(S)   : Robert C. Moore It is certified that error appears in the above-identified patent and that said Letters Patent is hereby corrected as shown below:

<u>Title page, Item [54] and Column 1, line 1,</u>
The correct Title is -- IN SITU FORMATION OF APATITE FOR SEQUESTERING RADIONUCLIDES AND HEAVY METALS --

Signed and Sealed this

Eleventh Day of November, 2003

JAMES E. ROGAN
*Director of the United States Patent and Trademark Office*